United States Patent
Kumar et al.

(10) Patent No.: US 9,582,065 B2
(45) Date of Patent: Feb. 28, 2017

(54) DYNAMIC ADJUSTMENT OF DISPLAY CONTENT FOR POWER OPTIMIZATION OF A CONTINUOUS SCAN DISPLAY

(71) Applicant: NVIDIA Corporation, Santa Clara, CA (US)

(72) Inventors: Ratin Kumar, Cupertino, CA (US); Timothy Bornemisza, San Jose, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 219 days.

(21) Appl. No.: 13/975,148

(22) Filed: Aug. 23, 2013

(65) Prior Publication Data

US 2015/0054821 A1    Feb. 26, 2015

(51) Int. Cl.
*G06F 1/32* (2006.01)
*G09G 5/36* (2006.01)

(52) U.S. Cl.
CPC .......... *G06F 1/3234* (2013.01); *G06F 1/3218* (2013.01); *G06F 1/3265* (2013.01); *G09G 5/36* (2013.01); *G09G 2320/103* (2013.01); *G09G 2330/021* (2013.01); *G09G 2340/0428* (2013.01); *G09G 2350/00* (2013.01); *Y02B 60/1242* (2013.01)

(58) Field of Classification Search
None
See application file for complete search history.

(56) References Cited

U.S. PATENT DOCUMENTS

| | | | |
|---|---|---|---|
| 2002/0167542 A1* | 11/2002 | Florin | G06Q 30/02 715/745 |
| 2004/0133923 A1* | 7/2004 | Watson | G06Q 30/06 725/134 |
| 2008/0137159 A1* | 6/2008 | Lim | 358/520 |
| 2010/0309985 A1* | 12/2010 | Liu et al. | 375/240.25 |
| 2011/0161707 A1* | 6/2011 | Blackburn et al. | 713/323 |
| 2011/0242120 A1* | 10/2011 | Akai et al. | 345/531 |

OTHER PUBLICATIONS

Choi, Inseok, Hojun Shim, and Naehyuck Chang. "Low-power color TFT LCD display for hand-held embedded systems." Low Power Electronics and Design, 2002. ISLPED'02. Proceedings of the 2002 International Symposium on. IEEE, 2002.*
Brendel, Harald. "The Arri Companion to Digital Intermediate." URL: http://dicomp. arri.de/digital/digital_systems/Dlcompanion/index. html (Chapter 3) (2005).*
"Saving Energy with VSync Control" http://msdn.microsoft.com/en-us/library/windows/hardware/ff569520(v=VS.85).aspx. Archived on Dec. 6, 2011. Retrieved on May 31, 2015 from <https://web.archive.org/web/20111206225207/http://msdn.microsoft.com/en-us/library/windows/hardware/ff569520(v=VS.85).aspx>.*

* cited by examiner

*Primary Examiner* — Zhengxi Liu

(57) ABSTRACT

Various embodiments relating to reducing memory bandwidth consumed by a continuous scan display screen are provided. In one embodiment, an indication of a static image period of a continuous scan display screen is determined. A reference image of a first image format having a first bit depth is converted into a modified image of a second image format having a second bit depth that is less than the first bit depth. During the static image period, the modified image is scanned onto the continuous scan display screen.

12 Claims, 3 Drawing Sheets

DYNAMIC ADJUSTMENT OF DISPLAY CONTENT FOR POWER OPTIMIZATION OF A CONTINUOUS SCAN DISPLAY

BACKGROUND

High quality, high resolution displays are now widely used in various mobile computing devices. Such high resolution displays require fast processing to deliver high resolution imagery, smooth user interface interactions, fast Web page rendering, and quality 3D gaming, among other operations. However, such features may consume a significant amount of power. In order to prolong battery life of a mobile computing device, power consumption of various hardware components of the mobile computing device may be reduced whenever possible without sacrificing noticeable quality of displayed imagery or user interactions.

DETAILED DESCRIPTION

The present description relates to managing system properties (for example reducing memory bandwidth) consumed by a continuous scan display screen of a computing device. More particularly, the present description relates to down-converting an image scanned on the display screen for a period when there is no change to the image in order to reduce power consumption for the operation of the display. This period may be referred to herein as a static image period or a static image condition. Upon detecting a static image period, a reference image may be converted to a different image format with a lesser bit depth, and the modified image may be displayed during the static image period. Selective use of this approach allows for higher definition when an image is being actively altered while lowering a burden on system resources when there is no change to the image. Such an approach may be preferably implemented in a mobile computing device, such as a system-on-chip (SOC) application, to achieve energy efficiency, better thermal characteristics and/or prolong battery life of the mobile computing device.

In some embodiments, a reference image is down-converted only if the reference image meets scoring criteria that determines how much the image would be negatively affected by the down conversion. For example, highly saturated images (e.g., black and white images) may be less affected by conversion to an image format having a lesser bit depth. Accordingly, in one example, the scoring criteria are based at least partially on a saturation level of the reference image. By detecting and distinguishing between images that are amenable to the pixel depth reduction, down-conversion of an image can be applied with limited impact on a perceived quality of the image to the user in order to reduce memory bandwidth consumed by scanning the image to the display screen. The detection of amenable image can be done in hardware or software. Further such a determination may be arrived at by various methods including but not limited to sampling images and/or software and/or hardware to analyze all images generated.

Figure 1:
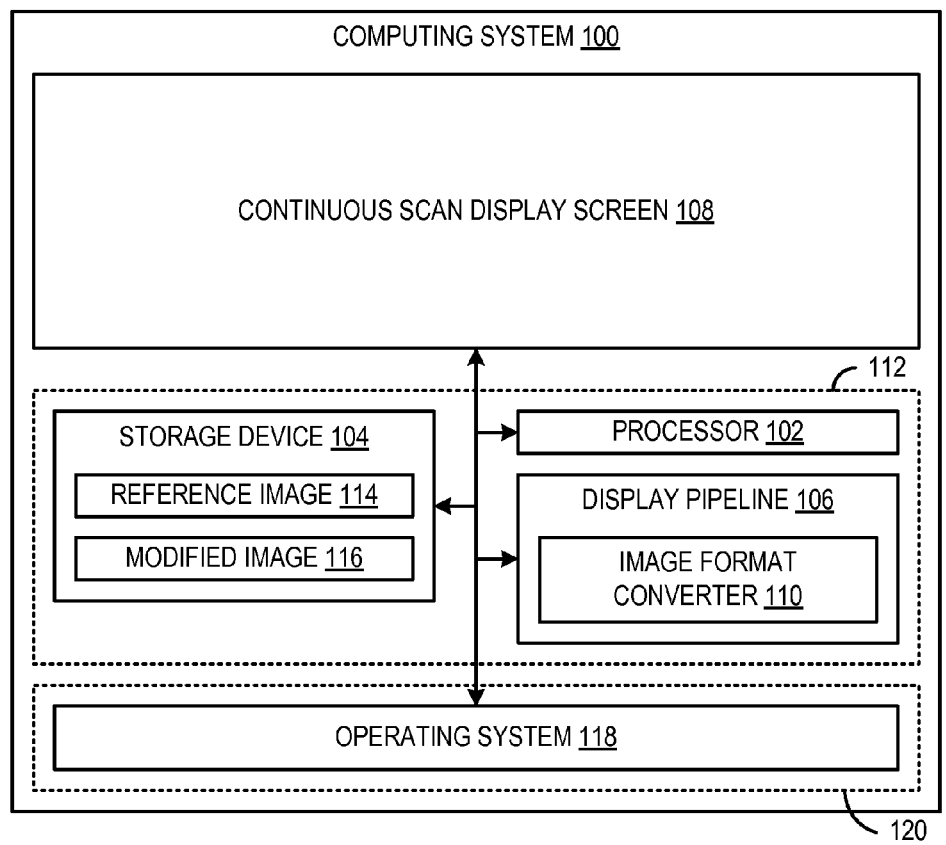
FIG. 1 schematically shows a computing system according to an embodiment of the present disclosure.

FIG. 1 schematically shows a computing system 100 according to an embodiment of the present disclosure. The computing system 100 may take the form of one or more personal computers, home-entertainment computers, network computing devices, gaming devices, mobile computing devices (e.g., tablet), mobile communication devices (e.g., smart phone), and/or other computing devices. The computing system 100 includes a processor 102 in communication with a storage device 104, a display pipeline 106, and a continuous scan display screen 108.

The processor 102 includes one or more processor cores, and instructions executed thereon may be configured for sequential, parallel, and/or distributed processing. The processor 102 includes one or more physical devices configured to execute instructions. For example, the processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

In one example, the processor includes a central processing unit (CPU) and a graphics processing unit (GPU) that includes a plurality of cores. In this example, computation-intensive portions of instructions are executed in parallel by the plurality of cores of the GPU, while the remainder of the instructions is executed by the CPU. It will be understood that the processor may take any suitable form without departing from the scope of the present description.

The storage device 104 includes one or more physical devices configured to hold instructions executable by the processor. When such instructions are implemented, the state of the storage device may be transformed—e.g., to hold different data. The storage device may include removable and/or built-in devices. The storage device may include optical memory, semiconductor memory, and/or magnetic memory, among others. The storage device may include volatile, nonvolatile, dynamic, static, read/write, read-only, random-access, sequential-access, location-addressable, file-addressable, and/or content-addressable devices. It will be understood that the storage device may take any suitable form without departing from the scope of the present description.

Storage locations of the storage device include a memory allocation accessible by the processors during execution of instructions. This memory allocation can be used for execution of one or more software layer 120 that may include an operating system 118 that manages software-level operation of the computing system.

The display pipeline 106 is configured to render a two-dimensional raster representation of an image for display on the continuous scan display screen. The display pipeline includes a plurality of logic units and/or hardware units. In some embodiments, at least some of the units are fixed purpose or operation specific units. However, in some embodiments, some units are general purpose units that may perform different steps of the pipeline, and in some cases, perform general purpose computing.

One of the units of the display pipeline includes an image format converter 110 that may be implemented as hardware, firmware or software. The image format converter is configured to convert an image from a first image format to a second image format that is different from the first image format. In some cases, the image format converter down-converts an image to a format having a lesser bit depth. In one particular example, the image format converter is configured to convert an image from a first image format that has a bit depth of 24 bits per pixel (e.g., 888 RGB) to a second image format that has a bit depth of 16 bits per pixel (e.g., 565 RGB). In one example, the image format converter is configured to down-convert an image by truncating the bit depth of each bit of the image format. By down-converting the image, a memory bandwidth utilized to scan the image onto the continuous scan display screen may be reduced, and correspondingly power consumption of operation of the continuous scan display screen may be reduced.

It will be understood that the visual appearance of the reference image is not otherwise changed by the conversion beyond the down-conversion to a format having a lesser bit depth. It will be understood that the image format converter may convert an image from virtually any suitable image format to virtually any other suitable image format in any suitable manner without departing from the scope of the present description. For example, in some embodiments, the image format converter is configured to convert a reference image of a YUV image format to a modified image of a different YUV format having a lesser bit depth. In another example, the image format converter is configured to convert a reference image of a YUV image format to a modified image of a RGB image format. In yet another example, the image format converter is configured to convert a reference image of a RGB format to a modified image of a YUV image format.

In some embodiments, the processor, the storage device, and the display pipeline may be implemented as a system-on-chip (SoC) 112. In a SoC implementation, typically the processor, the storage device, and the display pipeline, are formed as separate logic units within a single SoC integrated circuit, and an on-chip communications interface enables communication between these separate logic units. Further, in some embodiments, the display pipeline may be physically integrated with the processor. In some embodiments, one or more of the processing steps may be performed in software.

The continuous scan display screen 108 is used to present a visual representation of data held by the storage machine in the form of an image. The image is rendered by the display pipeline. The continuous scan display screen is configured to repeatedly update a state of pixels that make up the display screen to display the image. In particular, the continuous scan display screen systematically processes the area of the pixels line by line or "scans" the pixels to update the image. The processor is configured to control the continuous scan display screen by scanning an image produced by the display pipeline on to the continuous scan display screen.

As the herein described methods and processes may change the data held by the storage device, and thus transform the state of the storage device, the state of display screen may likewise be transformed to visually represent changes in the underlying data. In the illustrated example, a reference image 114 of a first image format having a first bit depth is stored in the storage device, and further scanned on the continuous scan display screen. The image format converter may convert the reference image to a modified image 116 of a second image format having a second bit depth that is less than the first bit depth in response to determination of an operating condition, such as a static image condition that includes a period where an image remains unchanged or is not updated. The modified image may be stored in the storage device, and further scanned on the continuous scan display screen in place of the reference image, under some conditions. In some embodiments, the reference image and/or the modified image may be stored in a buffer of the display pipeline, and scanned directly to the continuous scan display screen.

It will be understood that the continuous scan display screen is used merely as an example, and any type of display screen technology may be employed. Such display devices may be combined with the processor and the storage device in a shared enclosure, or such display devices may be peripheral display devices.

As discussed above, the computing system is configured to reduce memory bandwidth consumed by the continuous scan display screen when possible. In one example, the processor is configured to determine a static image period where no updates are happening to the reference image and the image is otherwise unmodified. For example, the static image period may be defined as a period in which an image displayed on the continuous scan display screen is not expected to change for several frames. In one example, an indication of the static image period is received from the operating system. For example, the indication of the static image period may include a command to stop generating or triggering image synchronization operation interrupts (e.g., VSYNC interrupts). Further, in response to determining the static image period, the processor is configured to trigger the image format converter to convert the reference image to the modified image, and scan the modified image onto the continuous scan display screen during the static image period. In some embodiments, the processor may be configured to delay triggering the image format converter for a designated duration from a start of the idle display condition. For example, the designated duration may last from 1-2 seconds from the start of the idle display condition. By delaying conversion of the reference image for the designated duration, a likelihood of the display screen becoming active and ending the static image period may be reduced and confidence in the static image period may be increased. It will be understood that this technique and other techniques may be used to improve instances when the conversion may be used and, or improve the quality of user experience.

Correspondingly, the processor is configured to determine an active image period or condition that occurs when the static image period is not occurring. In one example, an indication of the active image period is determined based on whether VSYNC interrupts are being generated by the display pipeline. Further, the processor may be configured to scan the reference image on to the continuous scan display screen during the active image period.

In some embodiments, measures may be taken to determine whether a reference image is a suitable candidate for conversion. In particular, an image quality of some images, as perceived by a user, may be more negatively affected by a down-conversion than other images based on various characteristics of the images. For example, highly saturated images may be less affected by a reduction in bit depth than images having a lower saturation level.

In one example, the processor is configured to apply scoring criteria to the reference image to generate an image conversion score in response to an operating condition. For example, the operating condition may include a static image period of the continuous scan display screen. It will be understood that any suitable operating condition may be determined without departing from the scope of the present description. The processor is further configured to compare the image conversion score to one or more threshold values to yield either an affirmative output or a negative output. If the comparison yields an affirmative output, the processor is configured to convert the reference image to the modified image and scan the modified image onto the continuous scan display screen during the operating condition. If the comparison yields a negative output, the processor is configured to scan the reference image onto the continuous scan display screen during the operating condition.

In a particular example, the scoring criteria includes a saturation threshold value, and if a saturation level of the reference image is less than the saturation threshold value, the processor is configured to scan the reference image onto the continuous scan display screen during the operating condition. If the saturation level of the reference image is greater than the saturation threshold value, the processor is configured to scan the modified image onto the continuous scan display screen during the operating condition.

Figure 2:
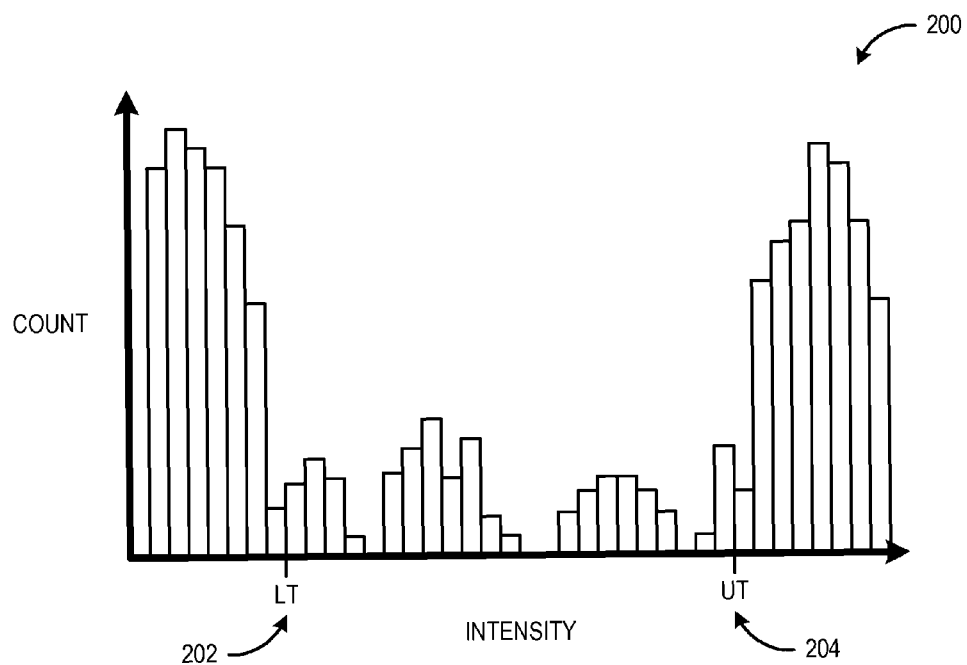
FIG. 2 shows an example of a histogram of pixel intensity of a reference image that may be determined to be suitable for image format conversion based on an image conversion score of the reference image.
Figure 3:
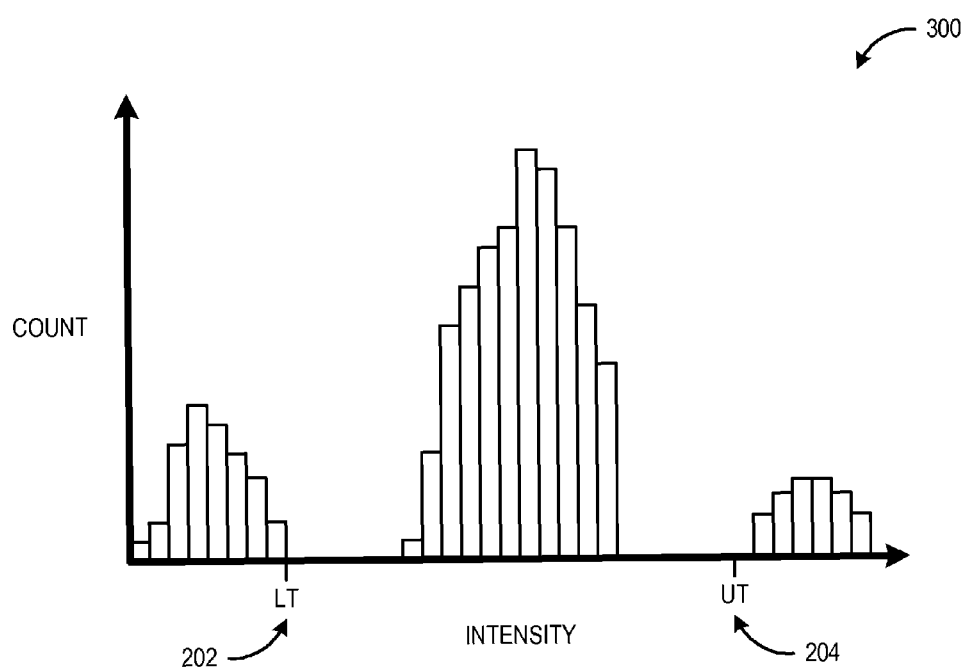
FIG. 3 shows an example of a histogram of pixel intensity of a reference image that may be determined to be unsuitable for image format conversion based on an image conversion score of the reference image.

In another example the scoring criteria is determined based on a histogram of pixel intensity of the reference image. In particular, the display pipeline is configured to generate a histogram of pixel intensity of a reference image during processing of that reference image. FIGS. 2-3 show examples of histograms of pixel intensity of a reference image that may be generated by the display pipeline and used by the processor to determine a conversion score of the reference image. The histograms include a plurality of different buckets that represent different pixel intensities of the reference image. The heights of the buckets represent the number of pixels in the image having that pixel intensity.

In the illustrated examples, the processor is configured to scan the reference image onto the continuous scan display screen during the operating condition if a pixel intensity of the reference image is less than an upper pixel intensity threshold value and greater than a lower pixel intensity threshold value. Further, the processor is configured to scan the modified image onto the continuous scan display screen during the operating condition if the pixel intensity of the reference image is greater than the upper pixel intensity threshold value or less than the lower pixel intensity threshold value. In one example, the pixel intensity is determined by taking a dot-product of the histogram and a score map of each bin of the histogram. However, it will be understood that the pixel intensity may be determined in another manner without departing from the scope of the present description. For example, scoring may be performed on a per-channel histogram of an image to increase scoring granularity.

FIG. 2 shows an example of a histogram 200 of pixel intensity of a reference image that may be determined to be suitable for image format conversion based on an image conversion score of the reference image. In particular, a lower pixel intensity threshold value 202 and an upper pixel intensity threshold value 204 are set to determine the suitability of the reference image for image format conversion. It will be understood that the upper and lower threshold values may be set to any suitable pixel intensity without departing from the scope of the present description. The histogram 200 indicates that a majority of the pixels of the image are in the top-most bins above the upper threshold value (close to fully saturated) or in the lowest bins below the lower threshold value (near black). The upper and lower threshold values are set as part of the scoring criteria, because the sorts of pixels above the upper threshold and below the lower threshold may be nearly indistinguishable between an image format having greater bit depth (e.g., 32 bpp) and an image format having lesser bit depth (e.g., 16 bpp).

FIG. 3 shows an example of a histogram 300 of pixel intensity of a reference image that may be determined to be unsuitable for image format conversion based on an image conversion score of the reference image. In particular, the histogram 300 indicates that a majority of the pixels of the image are in the middle bins below the upper threshold value and above the lower threshold value. These sorts of pixels may be more negatively affected by a down-conversion of the reference image as perceived by the user. As such, the reference image may not be converted during the operating condition.

It will be understood that any suitable characteristics may be included in the scoring criteria without departing from the scope of the present description.

Figure 4:
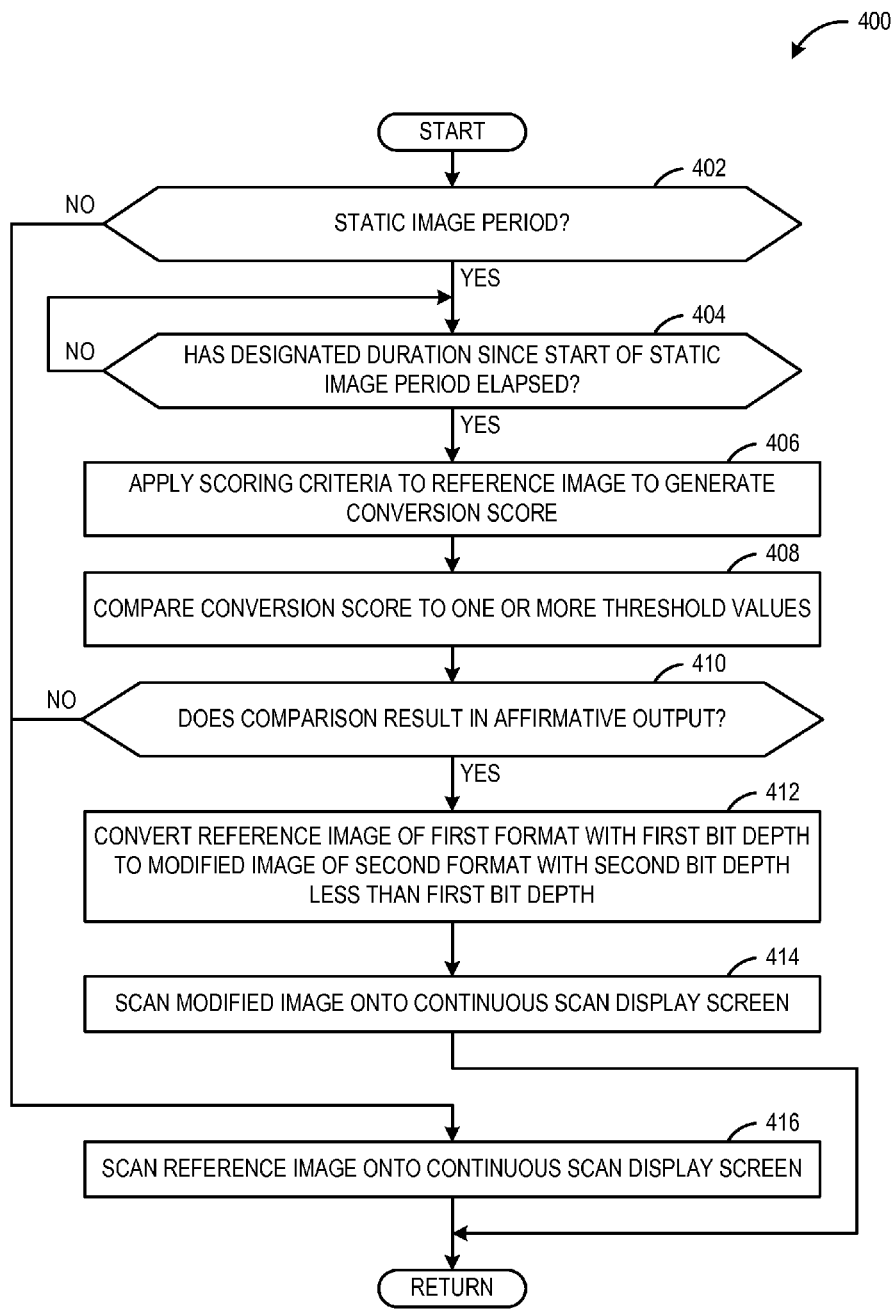
FIG. 4 shows a method for switching an image format of an image displayed by a continuous scan display screen according to an embodiment of the present disclosure.

FIG. 4 shows a method 400 for switching an image format of an image displayed by a continuous scan display screen according to an embodiment of the present disclosure. For example, the method 400 may be performed by the processor 102 of the computing system shown in FIG. 1.

At 402, the method 400 includes determining whether there is a static image period of the display screen. In one example, the determination may be made in response to receiving, from an operating system, an indication that the operating system does not expect to change an image for a plurality of image frames. Such an indication may include a command to stop generating image synchronization operation interrupts. It will be understood that the determination may be made in any suitable manner. If it is determined that there is a static image period, then the method 400 moves to 404. Otherwise, the method 400 moves to 416.

At 404, the method 400 includes determining whether a designated duration since a start of the static image period has elapsed. For example, the designated duration may be from 1-2 seconds. If it is determined that the designated duration has elapsed, then the method 400 moves to 406. Otherwise, the method 400 returns to 404.

At 406, the method 400 includes applying scoring criteria to the reference image to generate conversion score for the reference image. For example, the scoring criteria may be based at least partially on a saturation level of the reference image.

At 408, the method 400 includes comparing the image conversion score to one or more threshold values. In one example, the image conversion score is representative of a saturation level of the reference image and is compared to a saturation threshold value. In another example, the image conversion score is representative of a pixel intensity of the reference image, and is compared to upper and lower pixel intensity threshold values. Such comparisons yield either an affirmative output or a negative output.

At 410, the method 400 includes determining whether the comparison yields an affirmative output or a negative output. If it is determined that the comparison yields an affirmative output, then the method 400 moves to 412. Otherwise, the method 400 moves to 416.

At 412, the method 400 includes converting the reference image of a first image format having a first bit depth to a modified image of a second image format having a second bit depth that is less than the first bit depth. In one example, the first image format has a bit depth of 24 bits per pixel and the second image format has a bit depth of 16 bits per pixel.

At 414, the method 400 includes scanning the modified image onto the continuous scan display screen. The modified image is scanned onto the display screen during the static image period in order to reduce memory bandwidth consumed by the display screen. In one example, the modified image is scanned onto the display screen for the entirety of the static image period.

On the other hand, if it is determined that there is an active image period that occurs when the static image period is not occurring, or that the image conversion score of the reference image yields a negative output when compared to the one or more threshold values, at 416, the method 400 includes scanning the reference image onto the continuous scan display screen. The reference image is scanned onto the display screen, because it is determined that the operating conditions and/or the characteristics of the reference image would cause display of a corresponding modified image to be negatively perceived by the user.

It will be understood that methods described herein are provided for illustrative purposes only and are not intended to be limiting. Accordingly, it will be appreciated that in some embodiments the methods described herein may include additional or alternative steps or processes, while in some embodiments, the methods described herein may include some steps or processes that may be reordered, performed in parallel or omitted without departing from the scope of the present disclosure.

It will be understood that while the examples above focus on continuous scan displays of mobile computing devices, the description may be broadly applicable to other electronic devices. Moreover, it will be understood that the concepts discussed herein may be broadly applicable to dynamically altering display content and system properties associated with the display content in order to optimize energy consumption for scan out to a continuous scan display screen. Furthermore, it will be understood that the methods described herein may be performed using any suitable software and hardware in addition to or instead of the specific examples described herein. The subject matter of the present disclosure includes all novel and non-obvious combinations and sub-combinations of the various processes, systems and configurations, and other features, functions, acts, and/or properties disclosed herein, as well as any and all equivalents thereof. It will be understood that the configurations and/or approaches described herein are exemplary in nature, and that these specific embodiments or examples are not to be considered in a limiting sense, because numerous variations are possible.

The invention claimed is:

1. A method for switching an image format of an image displayed by a continuous scan display screen of a computing device, the method comprising:
   determining a static image period of the continuous scan display screen, wherein the determining comprises receiving an indication from an operating system executed by the computing device that the operating system does not expect to change a displayed image for a plurality of image frames;
   converting a reference image of a first image format having a first bit depth to a modified image of a second image format having a second bit depth that is less than the first bit depth;
   responsive to a determination that a pixel intensity of the reference image is less than an upper pixel intensity threshold value and greater than a lower pixel intensity threshold value, scanning the reference image onto the continuous scan display screen during the static image period; and
   responsive to a determination that the pixel intensity of the reference image is greater than the upper pixel intensity threshold value or less than the lower pixel intensity threshold value, scanning the modified image onto the continuous scan display screen during the static image period, wherein the pixel intensity is determined by taking a dot-product of a histogram of pixel intensity of the reference image and a score map of each bin of the histogram.

2. The method of claim 1, further comprising:
   scanning the reference image on to the continuous scan display screen during an active image period that occurs while the static image period is not occurring.

3. The method of claim 1, further comprising:
   delaying conversion of the reference image to the modified image for a designated duration from a start of the static image period.

4. The method of claim 1, where the indication of the static image period includes a command to stop generating image synchronization operation interrupts.

5. The method of claim 1, wherein the first image format has a bit depth of 24 bits per pixel and the second image format has a bit depth of 16 bits per pixel.

6. A computing system, comprising:
   a continuous scan display screen;
   a storage device configured to store a reference image of a first image format having a first bit depth;
   an image format converter configured to convert the reference image to a modified image of a second image format having a second bit depth less than the first bit depth; and
   a processor configured to (i) determine a static image period of the continuous scan display screen using an indication received from an operating system executed by the computing system that the operating system does not expect to change a displayed image for a plurality of image frames, and in response to the static image period (ii) trigger the image format converter to convert the reference image to the modified image, (iii) scan the reference image onto the continuous scan display screen during the static image period responsive to a determination that a pixel intensity of the reference image is less than an upper pixel intensity threshold value and greater than a lower pixel intensity threshold value, and (iv) scan the modified image onto the continuous scan display screen during the static image period responsive to a determination that the pixel intensity of the reference image is greater than the upper pixel intensity threshold value or less than the lower pixel intensity threshold value, wherein the pixel intensity is determined by taking a dot-product of a histogram of pixel intensity of the reference image and a score map of each bin of the histogram.

7. The computing system of claim 6, wherein the processor is configured to (i) determine an active image period that occurs while the static image period is not occurring, and (ii) scan the reference image on to the continuous scan display screen during the active image period.

8. The computing device of claim 6, where the processor is configured to detect the static image period from a command to stop generating image synchronization operation interrupts received from an operating system.

9. The computing device of claim 8, wherein the image synchronization operation interrupts comprise VSYNC interrupts.

10. The computing device of claim 6, where the processor is configured to delay triggering the image format converter for a designated duration from a start of the idle display condition.

11. A method for switching an image format of an image displayed by a continuous scan display screen of a computing device, the method comprising:

in response to an operating condition, applying scoring criteria to a reference image of a first image format having a first bit depth to generate an image conversion score, wherein the scoring criteria is determined based on a histogram of each channel of the reference image and a score map of each bin of the histogram, wherein the operating condition includes a static image period of the continuous scan display screen, and wherein determining the static image period comprises receiving an indication from an operating system that the displayed image is not expected to change for a plurality of image frames;

comparing the image conversion score to one or more threshold values, where such comparing yields either an affirmative output or a negative output;

responsive to a determination that the comparing step yields an affirmative output, (i) converting the reference image to a modified image of a second image format having a second bit depth less than the first bit depth, and (ii) scanning the modified image onto the continuous scan display screen during the operating condition; and responsive to a determination that the comparing step yields a negative output, scanning the reference image onto the continuous scan display screen during the operating condition.

12. The method of claim 11, further comprising:

delaying conversion of the reference image to the modified image for a designated duration from a start of the static image period.

* * * * *